4 2 8 - 4 0 8 S R
6/12/84 XR 4,454,194

United States Patent [19]

Luebbe, Jr.

[11] 4,454,194

[45] Jun. 12, 1984

[54] LYOPHILIZATION PROCESS FOR PREPARING COMPOSITE PARTICLES FOR USE IN ELECTROCONDUCTIVE TRANSFER FILMS AND PRODUCTS PRODUCED THEREWITH

[75] Inventor: Ray H. Luebbe, Jr., Maitland, Fla.

[73] Assignee: Exxon Research and Engineering Co., Florham Park, N.J.

[21] Appl. No.: 395,584

[22] Filed: Jul. 6, 1982

[51] Int. Cl.[3] .......................... B32B 5/16; B41C 3/08; B41M 5/00; G03G 5/00; G03G 5/02

[52] U.S. Cl. ........................................ 428/323; 204/2; 346/135.1; 427/123; 427/124; 427/125; 427/146; 427/152; 427/202; 427/203; 427/205; 427/220; 427/221; 427/350; 427/377; 427/398.1; 427/398.4; 428/339; 428/403; 428/407; 428/408; 428/688; 428/913

[58] Field of Search .......................... 204/2; 282/27.5; 346/135.1; 427/123, 124, 125, 126, 146, 152, 202, 203, 205, 220, 221, 350, 398.1, 398.4, 377; 428/323, 339, 403, 407, 408, 688, 913

[56] References Cited

U.S. PATENT DOCUMENTS 4,163,075 7/1979 Nakano et al. ...................... 428/328

*Primary Examiner*—James C. Cannon
*Attorney, Agent, or Firm*—Kenneth Watov

[57] ABSTRACT

A method for the preparation of conductive graphite particles useful as an electrically anisotropic support layer for an electroconductive transfer film comprising initially grinding a slurry of graphite particles in the presence of water or a solvent having freezing and vapor pressure properties similar to water, for a period of time sufficient to substantially completely disperse the graphite particles in the water or solvent. A binding or film forming polymer is then added to the graphite slurry, said polymer being soluble in the water or solvent. The resulting slurry is then subjected to a freeze drying step so that the water or solvent present is caused to sublime resulting in the formation of polymeric coated graphite particles of at least 0.2 microns in diameter. These particles can be incorporated into the support layer of a electroconductive transfer film.

19 Claims, 1 Drawing Figure

LYOPHILIZATION PROCESS FOR PREPARING COMPOSITE PARTICLES FOR USE IN ELECTROCONDUCTIVE TRANSFER FILMS AND PRODUCTS PRODUCED THEREWITH

BACKGROUND OF THE INVENTION

1. Field of the Invention

The present invention relates to a composite electrosensitive transfer material, and more particularly, to a reusable electrosensitive transfer film.

2. Description of the Prior Art

In recent years, various systems have been proposed for the rapid transmission and/or recording of information. One such system is an electric discharge recording system.

The electric discharge recording system is a process which comprises applying an electrical signal of several hundred volts and several watts in the form of an electric voltage, and breaking a semiconductive recording layer on the surface of a recording layer by electric discharge, thereby to form an image on the recording layer or on a substrate superimposed on the recording layer. This process is a "direct imaging" process which does not require processing operations such as development and fixation, and is in widespread use as a simple recording process. For example, the process finds applications in facsimile systems, various measuring instruments, recording meters, record displays in computers, and processing of electrostencil master sheets.

In the electric discharge recording, a discharge recording stylus is directly contacted with the recording surface of an electric discharge recording material. Discharging is performed through the stylus to break the recording layer, and to form an image on the recording surface.

A more recent development is disclosed by Nakano et al in U.S. Pat. No. 4,163,075 and relates to the use of an electrosensitive transfer film. To record with this type of film, it is laid over an untreated sheet of a receiving medium, such as paper, and an electric discharge stylus is moved in a regular pattern across the bakc of the transfer film. Provision is generally made to ground either one edge or the front surface of the transfer film. When a voltage on the order of 150 to 200 volts is applied to the stylus, current flows through the sheet and matter is caused to be transferred to the receiving sheet, e.g., paper.

The film disclosed by Nakano et al in U.S. Pat. No. 4,163,075, comprises three layers, namely a film support layer and two transfer layers. The support layer is composed of a metal powder-containing resin layer, e.g., electrolytic copper powder having an average diameter of 2 microns dispersed in a vinyl chloride resin.

Numerous disadvantages appear to exist with the use of the products disclosed in the Nakano et al patent. For example, the use of small metal particles in the support layer results in a high cost product affecting the commercial success of the product. A need therefore exists for a transfer sheet exhibiting improved image quality that can be produced at a low cost compared to other commercially available products.

SUMMARY OF THE INVENTION

It is an object of this invention to provide an electric discharge transfer film which is free from the disadvantages described hereinabove.

Another object of the present invention is to provide an electric discharge transfer film exhibiting improved image quality.

A further object of the present invention is to provide an electric discharge transfer film that can be produced in a simple and efficient manner and at a low cost.

According to the present invention, an electric discharge recording material is provided which comprises at least one resin layer capable of being thermally or electrothermally transferable to another substrate, and an electrically anisotropic graphite-containing resin layer which is laminated on one surface of one resin layer. The conductive graphite particles are prepared by grinding a slurry of graphite particles in the presence of water or a solvent having freezing and vapor pressure properties similar to water, for a period of time sufficient to substantially completely disperse the graphite particles in the water or solvent. A binding polymer is then added to the graphite slurry and wherein the binding polymer is soluble in the water or solvent. The slurry is then frozen and finally dried under conditions such that any water or solvent is caused to sublime, resulting in the formation of a substantial amount of polymeric coated graphite particles having a diameter of at least 0.2 microns.

Support layers for electroconductive transfer films are preferably prepared by solvent casting the coated graphite particles into a film with a resin and solvent in accordance with convention solvent casting techniques.

Other objects, features and effects of this invention will become more apparent from the following detailed description considered with the drawing wherein:

The FIGURE is an expanded sectional view of the transfer film of this invention.

DETAILED DESCRIPTION OF THE INVENTION

Figure 1:
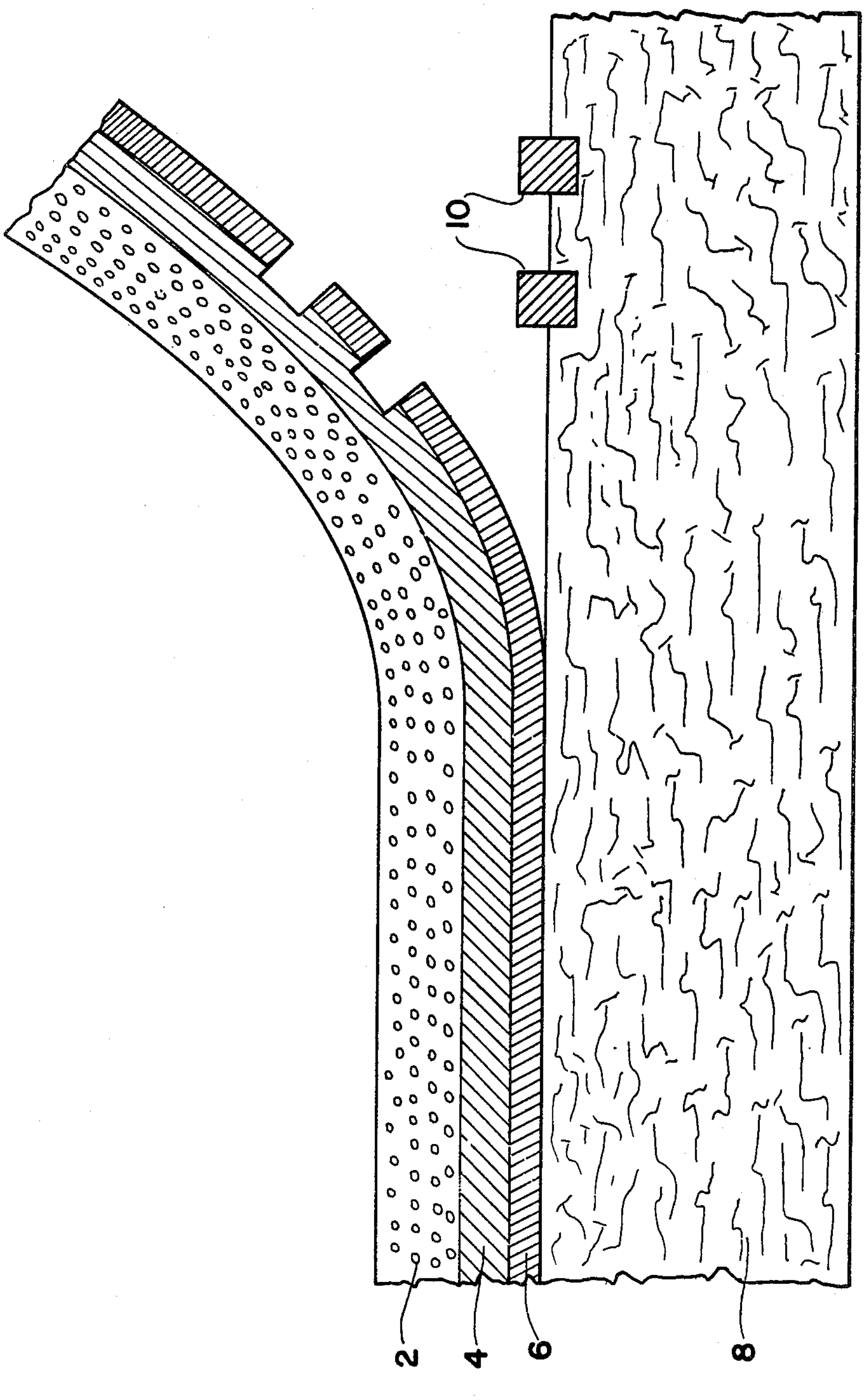

The preferred film structure utilizing the conductive graphite particles produced in accordance with this invention is illustrated in the FIGURE. The film comprises an electrically anisotropic, graphite-containing support layer 2 and at least one transfer layer, namely layers 4 and 6.

The graphite particles useful in the preparation of electric discharge transfer films are prepared by grinding the graphite particles in the presence of water or other solvent having substantially the same freezing and vapor pressure properties as water, e.g., tertiary butyl alcohol, cyclohexane, benzene, dioxane, and para-xylene. Generally, between about 70 and 80% by weight of the slurry is water or solvent, as defined herein, the balance being solids, namely the graphite particles. It is understood that the amount of water or solvent employed is not critical and can vary over wide ranges both below 70% and above 80% because the solvent or water is eventually driven off in accordance with this process. Grinding takes place for a period of time sufficient to achieve substantially complete dispersion of the graphite particles in the solvent or water. Generally, such grinding takes place between 8 and 16 hours to achieve the substantial dispersion of the graphite particles. The term "substantial", as used in this context, means at least 95% of the graphite being dispersed in the water or solvent with as little as possible agglomerization of the graphite being present. Grinding is generally accomplished by subjecting the slurry to a ball mill, sand mill or any other dispersion technique well known to those of ordinary skill in the art. It is particularly preferred to reduce agglomerates of graphite and to obtain substantial dispersion of the graphite particles with an "ATTRITOR", Model 01, made by Union Process Company, Dayton, Ohio.

A binding polymer is added to the graphite slurry for the purpose of forming a film or coating on the individual particles of graphite. The polymer employed is to be soluble in the water or solvent of the slurry. Suitable polymers include, e.g., polyvinyl alcohol, gelatin or methyl cellulose.

Freezing of the slurry is achieved by lowering the temperature to a point wherein the physical state of the solvent changes from liquid to solid. The frozen slurry is then dried, under conditions such that the water solvent present is caused to sublime, i.e., the solid is directly converted to the vapor form, without passage through the liquid state. The process results in the formation of a substantial amount of undamaged polymeric coated graphite particles having a diameter of at least 0.2 microns. By substantial amount, it is intended that at least 90% of the particles have a diameter of at least 0.2 microns.

Sublimation of water, or other solvents used in place of water, which exists in the solid state, can be caused to change to a gaseous phase without an intermediate phase, under well known changes in pressure alone, temperature alone, or a change in both temperature and pressure. Generally, sublimation can be produced under the influence of a high-pressure vacuum.

The resin which constitutes the resin matrix in which the binder coated graphite particles is dispersed in the formation of the support layer 2, by conventional solvent casting techniques, may be any thermoplastic or thermosetting resin which has film-forming ability and electrical insulation (generally having a volume resistance of at least $10^7$ ohms-cm). Generally, the matrix resin preferably has a great ability to bind the graphite particles and can be formed into sheets or films having high mechanical strength, flexibility and high stiffness. Generally, a sufficient amount of coated graphite is incorporated into the resin matrix so that the surface resistance of layer is at least $10^7$, and preferably $10^8$ ohms and the volume resistance of not more than $10^4$ ohm-cm and preferably no greater than $10^2$ ohm-cm, based on Dalton in U.S. Pat. No. 2,664,044. Generally, between 2 and 50% by weight graphite is present based on the total weight of the layer.

Examples of suitable resins that can be used in the preparation of support layer 2 are thermoplastic resins such as polyolefins (such as polyethylene or polypropylene), polyvinyl chloride, polyvinyl acetal, cellulose acetate, polyvinyl chloride, polyvinyl acetal, cellulose acetate, polyvinyl acetate, polystyrene, polymethyl acrylate, polymethyl methacrylate, polyacrylonitrile, thermoplastic polyesters, polyvinyl alcohol, and gelatin; and thermosetting resins such as thermosetting polyesters, epoxy resins, and melamine resins. The thermoplastic resins are preferred, and polyethylene, polyvinyl acetal, cellulose acetate, polymethane, and thermoplastic polyesters are especially preferred.

As is conventional in the art, additives such as plasticizers, fillers, lubricants, stabilizers, antioxidants or mold releasing agents may be added as needed to the resin in order to improve its moldability, storage stability, plasticity, tackiness, lubricity, etc.

Examples of the plasticizers are dioctyl phthalate, dibutyl phthalate, dicapryl phthalate, dioctyl adipate, diisobutyl adipate, triethylene glycol di(2-ethyl butyrate), dibutyl sebacate, dioctyl azelate, and triethylhexyl phosphate, which are generally used as plasticizers for resins. The amount of the plasticizer can be varied over a wide range according, for example, to the type of the resin and the type of the plasticizer. Generally, its amount is at most 150 parts by weight, preferably up to 100 parts by weight, per 100 parts by weight of the resin. The optimum amount of the plasticizer is not more than 80 parts by weight per 100 parts by weight of the resin.

Examples of fillers are fine powders of calcium oxide, magnesium oxide, sodium carbonate, potassium carbonate, strontium carbonate, zinc oxide, titanium oxide, barium sulfate, lithopone, basic magnesium carbonate, calcium carbonate, silica, and kaolin. They may be used either alone or as mixtures of two or more.

The amount of the filler is not critical, and can be varied over a wide range according to the type of the resin, the type of the filler, etc. Generally, the amount is up to 1000 parts by weight, preferably not more than 500 parts by weight, more preferably up to 200 parts by weight.

When a solvent is employed to form a cast sheet, any solvent can be used provided that the solvent is inert with respect to polymeric coated graphite particles. Preferred solvents include, e.g., methyl ethyl ketone, toluene, kerosene, water, and hydrocarbon solvents such as, for example TOLU-SOL. Generally, the amount of solvent can be varied over wide ranges, but generally between 2 and 30% by weight solids and preferably between 10 and 15% by weight solids is present in the solvent composition.

Usually the thickness of cast support layer 2 is at least 3 microns. The upper limit of the thickness is neither strict, but is advantageously set at 100 microns for the reason stated above. Preferably, the thickness is 5 to 60 microns, more preferably 10 to 40 microns.

As noted hereinbefore, the support layer is employed in combination with at least one layer that makes possible the thermal or electrothermal transfer to another substrate, e.g., paper. According to a preferred embodiment of this invention, two transfer layers 4 and 6, discussed in detail hereinafter, are employed.

The semiconductive resin layer 4 laminated on the graphite-containing resin layer is broken by discharging. It has a surface resistance of 10 to $10^9$ ohms, preferably $10^3$ to $10^7$ ohms, more preferably $10^4$ to $10^6$ ohms and a volume resistance of $10^1$ to $10^6$ ohms-cm, preferably 10 to $10^5$ ohms-cm, more preferably $10^2$ to $10^4$ ohms-cm.

The semiconductive resin layer 4 can be formed by dispersing a conductivity-imparting agent in a resin matrix.

The resin matrix forming a substrate for the semiconductive resin layer 4 may be chosen from those which have been described hereinabove about the non-recording layer composed of a metal powder-containing resin. The thermoplastic resins are especially suitable, and polyethylene, cellulose acetate and polyvinyl acetal are used advantageously. As needed, the resin may contain additives of the types described hereinabove such as plasticizers and fillers in the amounts described.

When a filler having a different conductvity from the conductivity-imparting agent, generally having a lower conductivity than the conductivity-imparting agent, is included in the semiconductive resin layer 4, the breakdown of the semiconductive resin layer 4 by electric discharging may occur more sharply. Suitable fillers of this kind are fine powders of inorganic substances such as magnesium oxide, calcium oxide, sodium carbonate, potassium carbonate, strontium carbonate, titanium oxide, barium sulfate, lithopone, basic magnesium carbonate, calcium carbonate, silica, kaolin clay, and zinc oxide. They can be used singly or as a mixture of two or more. Of these, titanium oxide and calcium carbonate are especially suitable. The average particle diameter of the filler is generally 10 microns at most, preferably not more than 5 microns, more preferably 2 to 0.1 microns. The amount of the filler can be varied over a wide range according to the type of the resin, etc. The suitable amount is generally 10 to 2,000 parts by weight, preferably 20 to 1,000 parts by weight, more preferably 50 to 400 parts by weight, per 100 parts by weight of the resin.

The conductivity-imparting agent to be dispersed in the resin to impart semiconductivity may be any material which has conductivity and gives the surface resistance and volume resistance described above to the resin layer. Generally, suitable conductivity-imparting agents have a specific resistance, measured under a pressure of 50 kg/cm$^2$, of not more than $10^6$ ohms-cm. Examples of such a conductivity-imparting agent include carbon blacks; metals such as gold, silver, nickel, molybdenum, copper, aluminum, iron and conductive zinc oxide (zinc oxide doped with 0.03 to 2.0% by weight, preferably 0.05 to 1.0% by weight, based on the zinc oxide, of a different metal such as aluminum, gallium, germanium, indium, tin, antimony or iron); conductive metal-containing compounds such as cuprous iodide, stannic oxide, and metastannic acid; and zeolites. Of these, carbon blacks, silver, nickel, cuprous iodide, conductive zinc oxide are preferred, and carbon blacks and conductive zinc oxide are more preferred. The carbon blacks which also act as a coloring agent are most preferred.

Carbon blacks differ somewhat in conductivity according to the method of production. Generally, acetylene black, furnace black, channel black, and thermal black can be used.

The conductivity-imparting agent is dispersed usually in the form of a fine powder in the resin. The average particle diameter of the conductivity-imparting agent is 10 microns at most, preferably not more than 5 microns, especially preferably 2 to 0.005 microns. When a metal powder is used as the conductivity-imparting agent, it is preferably in a microspherical, dendric or microlumpy form. Moreover, since a resin sheet having the metal powder dispersed therein tends to be electrically anisotropic if its particle diameter exceeds 0.2 micron. Hence, the particle size of a metal powder in the above-mentioned form to be used as a conductivity-imparting agent for the semiconductive resin layer 4 or the conductive layer 6 should be at most 0.5 micron, preferably not more than 0.2 micron, more preferably 0.15 to 0.04 micron. Scale-like or needle-like powders can also be used, but should be combined with powders of the above forms.

The amount of the conductivity-imparting agent to be added to the resin can be varied over a very wide range according to the conductivity of the conductivity-imparting agent, etc. The amount is that sufficient to adjust the surface resistance and volume resistance of the semiconductive resin layer 4 to the above-mentioned ranges. For example, carbon blacks are incorporated generally in an amount of 1 to 300 parts by weight, preferably 2 to 200 parts by weight, more preferably 3 to 150 parts by weight, per 100 parts by weight of the resin. The other conductivity-imparting agents are used generally in an amount of 3 to 500 parts by weight, preferably 5 to 400 parts by weight, more preferably 10 to 300 parts by weight, per 100 parts by weight of the resin.

The thickness of the semiconductive resin layer 4 is not critical, and can be varied over a wide range according to the uses of the final product, etc. Generally, its thickness is at least 2 microns, preferably 3 to 50 microns, more preferably 5 to 20 microns.

According to the present invention, the conductive layer 6 is laminated on the other surface of the semiconductive resin layer 4.

The conductive layer 6 plays an important role in performing electric discharge breakdown with high accuracy by converging the current flowing through the semiconductive resin layer at a point immediately downward of the electric discharge recording stylus. The conductive layer 6 has a surface resistance of not more than $10^4$ ohms, preferably not more than $5\times10^3$ ohms, more preferably $10^{-1}$ to $2\times10^3$ ohms and a volume resistance of not more than $10^2$ ohms-cm, preferably not more than 50 ohms-cm, more preferably not more than 20 ohms-cm.

The conductive layer 6 having such resistance characteristics may be a conductive resin layer comprising a thermoplastic or thermosetting resin and a conductivity-imparting agent dispersed in it, a vacuum-deposited metal layer, or a metal foil layer.

The thermoplastic or thermosetting resin that can be used in the conductive resin layer can also be selected from those described hereinabove in connection with the non-recording layer. Of these, the thermoplastic resins, especially polyethylene, cellulose acetate and polyvinyl acetal, are used advantageously. The conductivity-imparting agent to be dispersed in the resin may be chosen from those described above in connection with the semiconductive resin layer. Carbon blacks and metal powders are especially suitable. Carbon blacks are particularly preferred over metals in view of cost factors.

The conductivity-imparting agents are added in amounts which will cause the resin layer to have the electrical resistance characteristics described above. The amounts vary greatly according to the type of the conductivity-imparting agent. For example, carbon blacks are used in an amount of generally at least 10 parts by weight, preferably 20 to 200 parts by weight, more preferably 30 to 100 parts by weight; the other conductivity-imparting agents especially metal powders, are used in an amount of at least 50 parts by weight, preferably 100 to 600 parts by weight, more preferably 150 to 400 parts by weight, both per 100 parts by weight of the resin.

As needed, the conductive resin layer may contain the aforesaid additives such as plasticizers and fillers in the amounts stated.

The thickness of the conductive resin layer is not critical, and can be varied widely according to the uses of the final products, etc. Generally, it is at least 3 microns, preferably 3 to 50 microns, more preferably 5 to 20 microns.

The conductive layer 6 may be a vacuum-deposited metal layer. Specific examples of the metal are aluminum, zinc, copper, silver and gold. Of these, aluminum is most suitable.

The thickness of the vacuum-deposited metal layer is neither restricted strictly. Generally, it is at least 4 millimicrons, preferably 10 to 300 millimicrons, more preferably 20 to 100 millimicrons. By an ordinary vacuum-depositing method for metal, it can be applied to one surface of the semiconductive resin layer 4.

The conductive layer 6 may also be a thin metal foil, for example an aluminum foil. It can be applied to one surface of the semiconductive resin layer 4 by such means as bonding or plating.

It is understood that at least one of the layers 4 and 6 may contain a coloring substance. Useful coloring substances are carbon black, inorganic and organic pigments, and dyes.

Carbon black has superior conductivity and acts both as a coloring substance and a conductivity-imparting agent as stated above. Thus, when the semiconductive resin layer or the conductive resin layer already contains carbon black as a conductivity-imparting agent, it is not necessary to add a further coloring substance. The inclusion of other suitable coloring substance is of course permissible.

Examples of pigments other than carbon black include inorganic pigments such as nickel yellow, titanium yellow, cadmium yellow, zinc yellow, ochre, cadmium red, prussian blue, ultramarine blue, zinc white, lead sulfate, lithopone, titanium oxide, black iron oxide, chrome orange, chrome vermilion, red iron oxide, red lead and vermilion, and organic pigments of the phthalocyanine, quinacridone and benzidine series such as aniline black, naphthol yellow S, hanza yellow 10G, benzidine yellow, permanent yellow, Permanent Orange, Benzidine Orange G, Indanthrene Brilliant Orange GK, Permanent Red 4R, Brilliant Fast Scarlet, Permanent Red F2R, Lake Red C, Cinquasia Red Y (Dup) (C.I. 46500), Permanent Pink E (FH) [Quido Magenta RV 6803 (HAR)], and Phthalocyanine Blue (C.I. Pigment Blue 15).

Examples of useful dyes are azoic dyes, anthraquinonic dyes, thionidigo dyes, quinoline dyes, and indanthrene dyes.

The pigments and dyes described are used either alone or in combination according to the color desired to be formed on a transfer recordng sheet.

The amount of the pigment or dye can be varied over a wide range according to the type, color intensity, etc. of the coloring substance. Generally, it is at least 1 part by weight, preferably 2 to 1,000 parts by weight, more preferably 3 to 500 parts by weight, per 100 parts by weight of the resin.

When the pigment or dye is to be incorporated in both of the semiconductive resin layer 4 and the conductive resin layer 6, it is desirable that pigments or dyes be of an identical color or have colors of the same series.

The composite electric discharge recording material of this invention can be formed by known methods, for example a melt-extrusion method, a melt-coating method, a melt-calendering method, a solution casting method, an emulsion casting method or combinations of these methods.

The composite electric discharge recording material of this invention described above is useful as an electric discharge transfer recording material or an electric stencil master sheet.

The electric discharge transfer recording mediums of the present invention are generally employed by superimposing the transfer recording medium onto a recording sheet 8, e.g., cellulosic paper, a synthetic paper-like sheet or a plastic sheet so that the conductive layer 6 contacts recording sheet 8. When electric discharge recording is performed by a discharge recording stylus in accordance with an ordinary method from the side of the graphite powder-containing resin layer 2, the semiconductive resin layer 4 and the conductive layer 6 are simultaneously broken by electric discharging, and the broken pieces 10 are transferred to the record sheet and fixed thereon, thereby achieving transfer recording.

According to a further embodiment of the present invention, a color coupler may be put in one or more transfer layers to react with a material in the recording material or paper, to generate a colored image, e.g., bis phenol A and leuco dye.

It is understood that the electric discharge transfer film of this invention can be processed to any desired width or length in accordance with its desired use. For example, the transfer film can be used in the form of a narrow tape, such as a typewriter ribbon.

In electric discharge recording, the semiconductive resin layer and the conductive layer of the composite electric discharge transfer recording material are broken down, but the graphite powder-containing resin layer is not broken because of its electric anisotropy and remains substantially unchanged. Accordingly, dissipation of any offensive odor issued at the time of electric discharge breakdown is inhibited, and soot or a coloring substance such as carbon black is prevented from scattering and adhering to the discharge recording stylus. The troublesome inspection and maintenance of the discharge recording stylus can be markedly reduced, and recording can be performed with high reliability. The term "electrical anisotropy" refers to the low resistance of support layer or carbon black containing resin layer 2 in the through direction and the high resistance of this layer in the lateral direction.

The use of the composite electric discharge recording material can afford a sharp recorded image, and in electric discharge transfer recording, a transfer recorded image having a high density, a natural appearance and a soft tone can be obtained.

The composite electric discharge recording material of this invention can be used a plurality of times.

The composite electric discharge recording material of this invention can be conveniently used in facsimile systems, terminal recording devices in electronic computers, automatic recording devices of automatic measuring instruments, and various types of printers, etc.

In the present application, the terms "surface resistance" and "volume resistance" are determined in accordance with the method set forth by Dalton in U.S. Pat. No. 2,664,044.

In the detailed description of the present invention, a transfer film comprising a support layer and two transfer layers is disclosed. It is understood that the present invention also encompasses the use of a support layer, as disclosed herein, having only one or possibly more than two resin layers provided that at least one of the layers is thermally or electrothermally transferable to another substrate, e.g., a paper sheet.

What is claimed is:

1. A method for the preparation of conductive graphite particles useful as an electrically anisotropic support layer for an electroconductive transfer film comprising:

(a) grinding a slurry of graphite particles in the presence of water or solvent having freezing and vapor pressure properties similar to water for a period of time sufficient to substantially completely disperse the graphite particles in said water or solvent;

(b) adding a binding polymer to said graphite slurry either as part of Step (a) or immediately after Step (a), wherein said polymer is soluble in said water or solvent;

(c) freezing said slurry; and (d) drying said slurry wherein said water or solvent present is caused to sublime resulting in the formation of polymeric coated graphite particles wherein at least a substantial portion of these particles have a diameter of at least 0.2 microns.

2. The method of claim 1 wherein said water-soluble or solvent soluble binding polymer is polyvinyl alcohol, gelatin or methyl cellulose.

3. The method of claim 2 wherein said graphite is dispersed in the presence of water.

4. The method of claim 2 wherein said slurry contains between 70 and 80% by weight water.

5. The method of claim 1 comprising grinding said graphite particles in the presence of a solvent.

6. The method of claim 5 wherein said solvent is t-butyl alcohol, cyclohexane, benzene, dioxane, or p-xylene.

7. The method of claim 6 comprising grinding said graphite in a ball mill for 8 to 16 hours.

8. The method of claim 1 comprising grinding said graphite in a ball mill for 8 to 16 hours.

9. Graphite particles produced in accordance with the process of claim 1.

10. An electrically anisotropic support layer produced by a process which comprises:

(a) grinding a slurry of graphite particles in the presence of water or solvent having freezing and vapor pressure properties similar to water for a period of time sufficient to substantially completely disperse the graphite particles in said water or solvent;

(b) adding a blinding polymer to said graphite slurry wherein said polymer is soluble in said water or solvent;

(c) freezing said slurry;

(d) drying said slurry wherein said water or solvent present is caused to sublime resulting in the formation of polyeric coated graphite particles wherein at least a substantial portion of these particles have a diameter of at least 0.2 microns; and (e) casting said coated graphite particles onto a support layer for an electroconductive transfer film.

11. The electrically anisotropic support layer of claim 10 wherein the process of production comprises solvent casting said coated graphite particles into a support layer for an electroconductive transfer film.

12. The electrically anisotropic support layer of claim 11 produced by a process wherein said water-soluble or solvent-soluble binding polymer is polyvinyl alcohol, gelatin or methyl cellulose.

13. The electrically anisotropic support layer of claim 12 wherein said graphite is dispersed in the presence of water.

14. The electrically anisotropic support layer of claim 12 wherein said slurry contains between 70 and 80% by weight water.

15. The electrically anisotropic support layer of claim 12 wherein the process of production comprises grinding said graphite particles in the presence of a solvent.

16. The electrically anisotropic support layer of claim 15 produced by a process wherein said solvent is t-butyl alcohol, cyclohexane, benzene, dioxane or p-xylene.

17. The electrically anisotropic support layer of claim 11 wherein the process of production comprises grinding said graphite in a ball mill for 8 to 16 hours.

18. An electric discharge transfer material comprising a transfer layer in the form of a resin layer capable of being broken by electric discharge and laminated to an electrically anisotropic support layer, as defined in claim 10.

19. An electric discharge transfer material comprising:

(a) a semiconductive resin layer capable of being broken by electric discharging which has a surface resistance of 10 to $10^9$ ohms and a volume resistance of 1 to $10^6$ ohms-cm;

(b) an electrically anisotropic support layer, as defined in claim 10 and laminated on one surface of the semiconductive resin layer (a); and (c) a conductive layer having a surface resistance of not more than $10^4$ ohms and a volume resistance of not more than $10^2$ ohms-cm, which is laminated on the other surface of the semiconductive resin layer.

* * * * *